United States Patent
Yamazaki et al.

(10) Patent No.: US 7,612,313 B2
(45) Date of Patent: Nov. 3, 2009

(54) PIPE SEAM DETECTION DEVICE OF THREE-DIMENSIONAL LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi pref. (JP)

(*) Notice: Subject to any disclaimer, the term of this patent is extended or adjusted under 35 U.S.C. 154(b) by 209 days.

(21) Appl. No.: 11/624,249

(22) Filed: Jan. 18, 2007

(65) Prior Publication Data

US 2007/0193989 A1 Aug. 23, 2007

(30) Foreign Application Priority Data

Feb. 23, 2006 (JP) .............................. 2006-046620

(51) Int. Cl.
*B23K 26/24* (2006.01)
(52) U.S. Cl. .............................. 219/121.63; 219/124.34
(58) Field of Classification Search ............ 219/121.63, 219/121.64, 124.34; 318/576; 200/61.42; 400/709
See application file for complete search history.

(56) References Cited

U.S. PATENT DOCUMENTS

| | | | | |
|---|---|---|---|---|
| 4,166,941 A | * | 9/1979 | Cecil | 219/124.34 |
| 4,547,772 A | * | 10/1985 | Ernst | 200/61.42 |
| 4,563,841 A | * | 1/1986 | Hart et al. | 451/2 |
| 4,988,201 A | * | 1/1991 | Sugitani et al. | 219/124.34 |
| 5,166,495 A | * | 11/1992 | Ekelof et al. | 219/124.34 |
| 7,455,380 B2 | * | 11/2008 | Takeishi | 400/709 |
| 2006/0118526 A1 | * | 6/2006 | McGushion | 219/60 A |

FOREIGN PATENT DOCUMENTS

| | | | |
|---|---|---|---|
| JP | 4-83111 A | * | 3/1992 |
| JP | 10-132509 | | 5/1998 |
| JP | 2001-150175 | | 6/2001 |
| JP | 2002-35971 A | * | 2/2002 |

OTHER PUBLICATIONS

European Search Report for corresponding Application No. 07 40 5030 dated Jun. 4, 2007.

* cited by examiner

*Primary Examiner*—Geoffrey S Evans
(74) *Attorney, Agent, or Firm*—Renner, Otto, Boisselle & Sklar, LLP

(57) ABSTRACT

A device for detecting the position of a seam on a welded pipe in a three-dimensional laser beam machine for processing pipes. The three-dimensional laser beam machine has a chuck 62 for holding, rotating and axially moving a cylindrical pipe 400. A weld seam detection device 100 is equipped with a sensor head 110 provided on a laser processing main body 30. The sensor head 110 has a master lever 120 that moves along an inner wall surface 410 of the cylindrical pipe 400 and a sensor lever 140. When the cylindrical pipe 400 is rotated and the sensor lever 140 contacts the weld seam, the movement of the sensor lever 140 is detected by a micro switch 150, which sends a signal to an NC device 90 by which the weld seam position is recognized.

6 Claims, 6 Drawing Sheets

PIPE SEAM DETECTION DEVICE OF THREE-DIMENSIONAL LASER BEAM MACHINE

The present application is based on and claims priority of Japanese patent application No. 2006-46620 filed on Feb. 23, 2006, the entire contents of which are hereby incorporated by reference.

BACKGROUND OF THE INVENTION

1. Field of the Invention

The present invention relates to a device for detecting a weld seam on a pipe member which is equipped in a laser beam machine for processing pipe members and the like.

2. Description of the Related Art

Laser beam machines for processing pipe members perform laser processing to pipe members via a laser processing head while rotating a chuck holding the pipe member.

For example, Japanese Patent Application Laid-Open Publication No. 2001-150175 discloses a laser beam machine capable of processing pipes.

The pipe material being subjected to processing can be a cylindrical pipe $P_1$ or a square pipe $P_2$ as illustrated in FIGS. 9A and 9B, and depending on the pipe material, the pipe can be a welded steel pipe in which a steel material is formed into a cylindrical or square pipe shape and the butted portion is bonded via welding.

In this type of welded pipes, weld beads $S_1$ and $S_2$ which are called seams are formed along the axis line of the pipes. The seams deteriorate the appearance of the pipes, so it is preferable not to form the seams on the outer sides of the pipes if possible. In addition, it is often necessary to avoid the seam when subjecting the pipe to laser processing for structural purposes. In these types of laser processing, it is necessary to confirm the position of the seam on the welded pipe and to compute the angle of the pipe to perform processing using the position of the seam as reference.

SUMMARY OF THE INVENTION

Therefore, the object of the present invention is to provide a laser beam machine having a detection device for detecting the position of the seam on a welded pipe.

In order to achieve the above object, the three-dimensional laser beam machine according to the present invention has a sensor head coming into contact with a seam on an inner wall surface of the pipe to detect the position of the seam on the welded pipe.

Further, the pipe seam detection device comprises a sensor head and a means for moving the sensor head up and down, and the sensor head comprises a sensor lever coming into contact with the seam and a limit switch for detecting the movement of the sensor lever. Furthermore, the sensor head comprises an air nozzle for providing air blow to the portion to be detected.

In addition, the sensor head is arranged close to a sensor lever, and the sensor head further comprises a lever that moves along the inner wall surface of the pipe in contact therewith.

According to the present invention, it becomes possible to detect the position of the seam on a welded pipe via a mechanical means without fail, and to perform three-dimensional laser processing automatically.

DETAILED DESCRIPTION OF THE PREFERRED EMBODIMENTS

Figure 1:
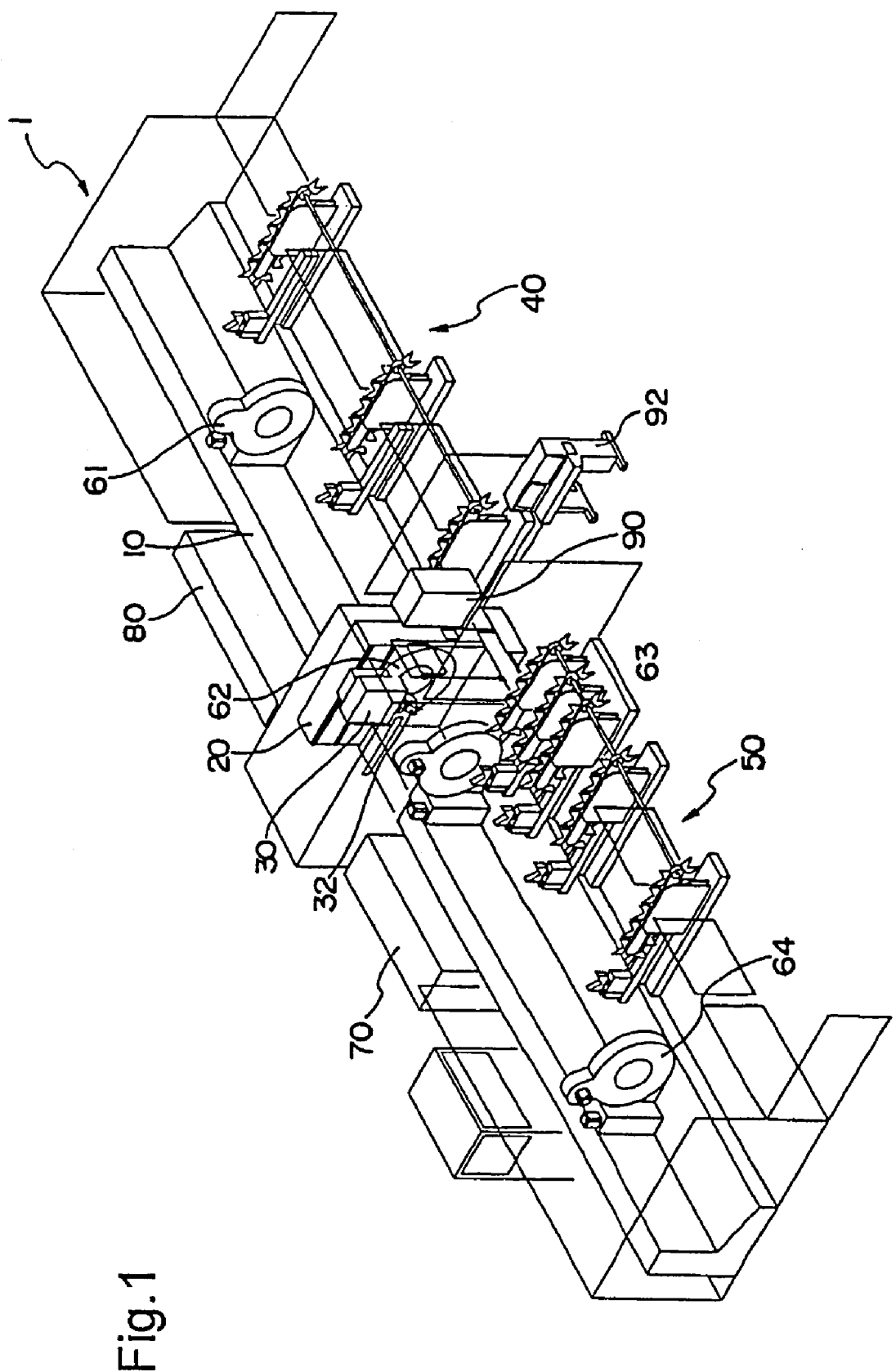
FIG. 1 is an explanatory view showing the outline of a three-dimensional laser beam machine to which the present invention is applied.

FIG. 1 is an explanatory view illustrating the outline of a three-dimensional laser beam machine to which the present invention is applied.

The three-dimensional laser beam machine illustrated as a whole by reference number 1 comprises a base 10 and a processing unit 20 arranged at the center of the base 10.

The processing unit 20 has a laser processing main body 30 arranged so as to be able to move in the axial direction. The laser processing main body 30 has a laser head 32 pivotally attached thereto.

A work automatic loading device (loader) 40 and a product automatic unloading device (unloader) 50 are arranged on the front and rear of the processing unit 20.

The three-dimensional laser beam machine 1 is equipped with four chucks 61, 62, 63 and 64 that move on the base 10. Each chuck is capable of holding works of various shapes such as pipe members and channel members, moving the work in the axial direction, controlling the rotation thereof and subjecting the work to three-dimensional laser processing.

The three-dimensional laser beam machine 1 is equipped with a laser oscillator 70, a control panel 80, an NC device 90, an operating panel 92 and so on.

Figure 2:
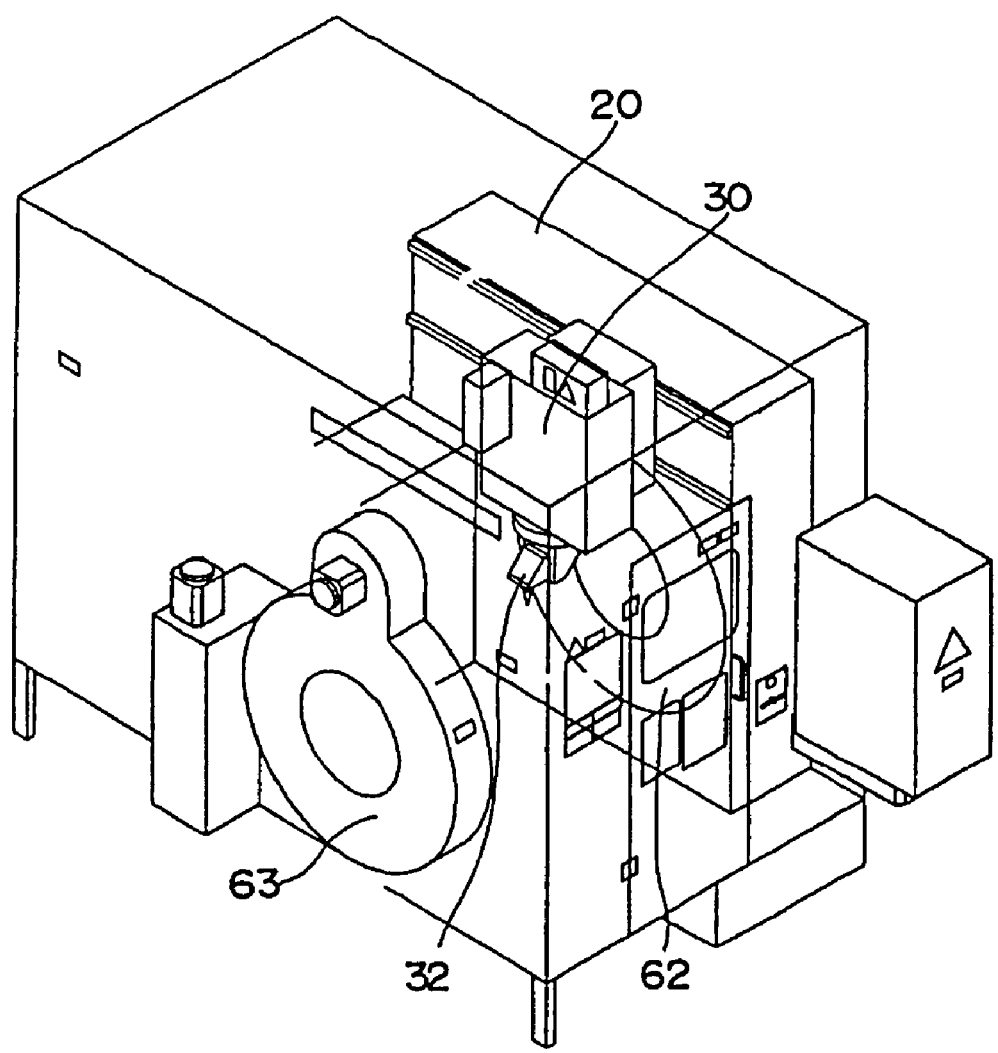
FIG. 2 is an explanatory view illustrating the details of the area near the processing unit.

FIG. 2 illustrates the details of the area near the processing unit 20, wherein the laser processing main body 30 is supported so as to be able to move in the axial direction on the processing unit 20. The laser processing main body 30 pivotally supports the laser head 32.

Figure 3:
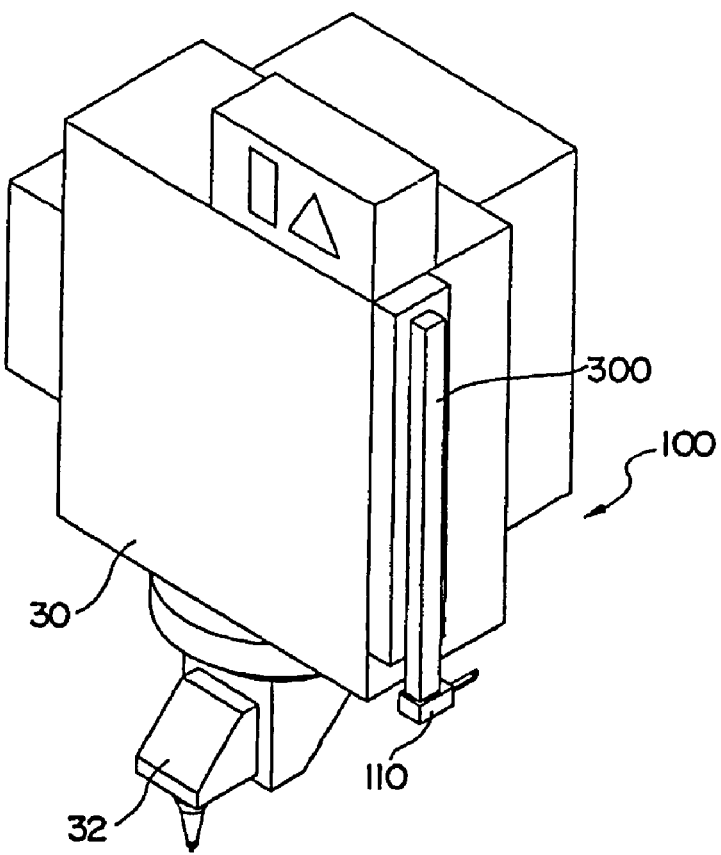
FIG. 3 is an explanatory view illustrating the weld seam detection device of the present invention equipped in a laser processing main body.

FIG. 3 illustrates the weld seam detection device 100 according to the present invention equipped to the laser processing main body 30.

The weld seam detection device 100 is equipped with a sensor head 110 and a driving device 300 for moving the sensor head 110 up and down.

Figure 4:
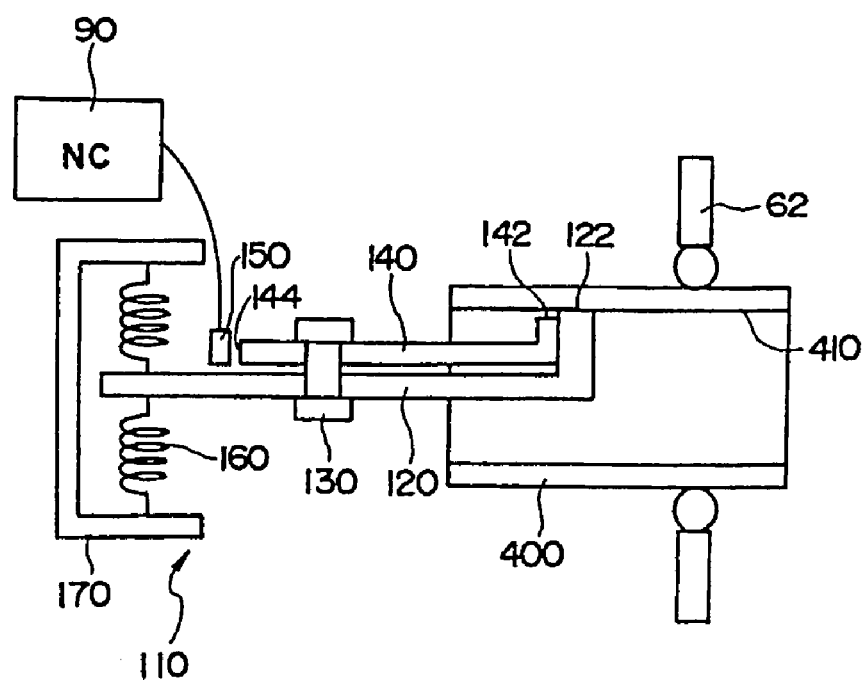
FIG. 4 is an explanatory view showing the basic principle of a sensor head.

FIG. 4 is an explanatory view showing the basic principle of the sensor head 110.

The sensor head 110 has a master lever 120 that comes into contact with an inner wall surface 410 of a cylindrical pipe 400 which is the object of detection (work). The master lever 120 is supported on a fixed member 170 via a floating mechanism including a spring 160 or the like.

In other words, the cylindrical pipe 400 is rotated by the chuck 62, and the sensor head 110 moves in the direction perpendicular to the paper plane, but during this operation, a contact unit 122 disposed at the leading end of the master lever 120 is constantly in contact with the inner wall surface 410 of the cylindrical pipe 400.

A sensor lever 140 is pivotally attached via a pin 130 on the master lever 120. The sensor lever 140 pivots around the pin 130 when a leading end 142 thereof comes into contact with a seam protruding from the inner wall surface 410 of the cylindrical pipe 400.

A micro switch 150 detects the movement of a rear end 144 of the sensor lever 140, and sends a signal to the NC device 90. The NC device 90 recognizes that the current position of the sensor head 110 corresponds to the seam position on the cylindrical pipe 400, and executes the subsequent laser processing.

Figure 5:
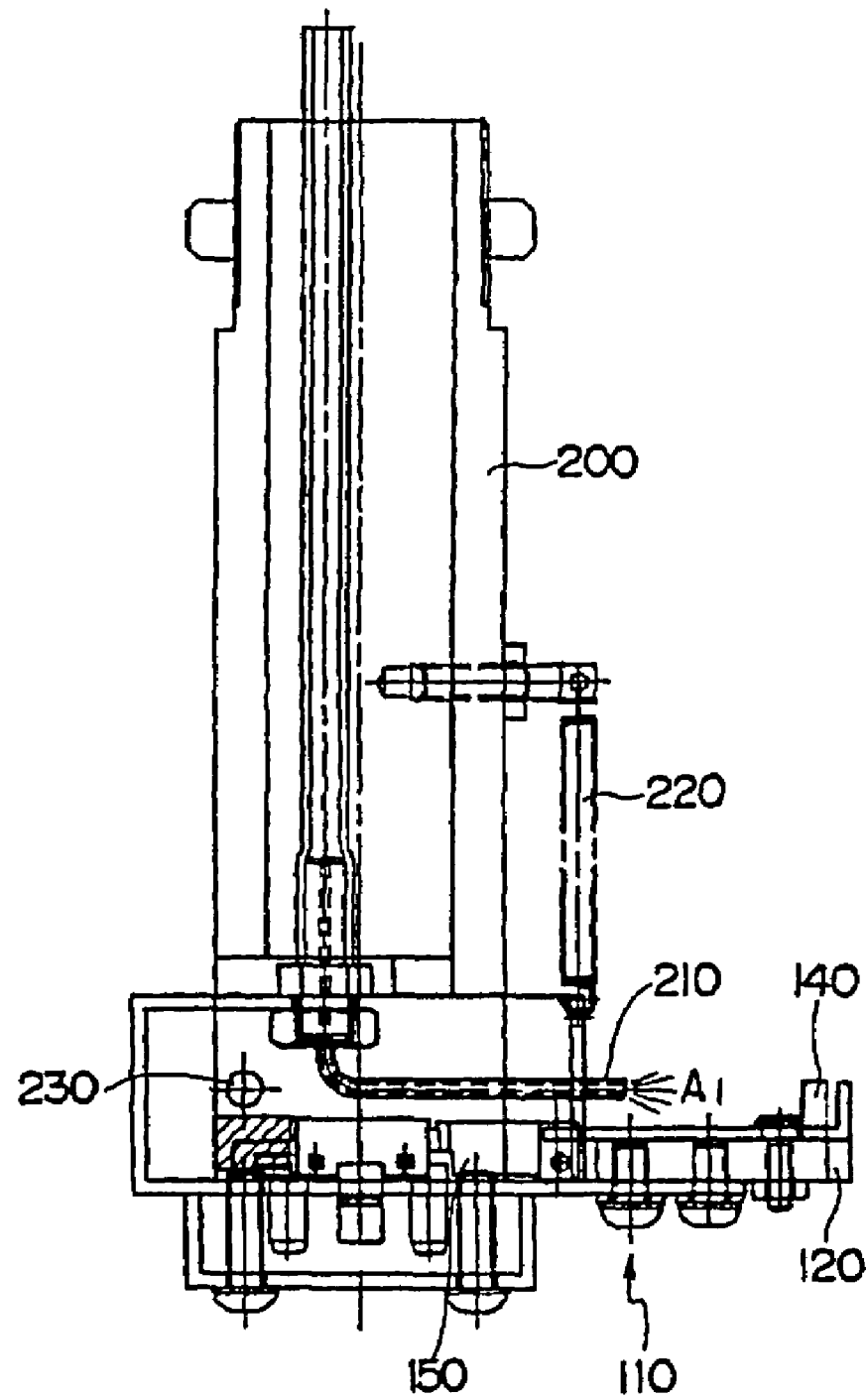
FIG. 5 is a front view of the sensor head.
Figure 6:
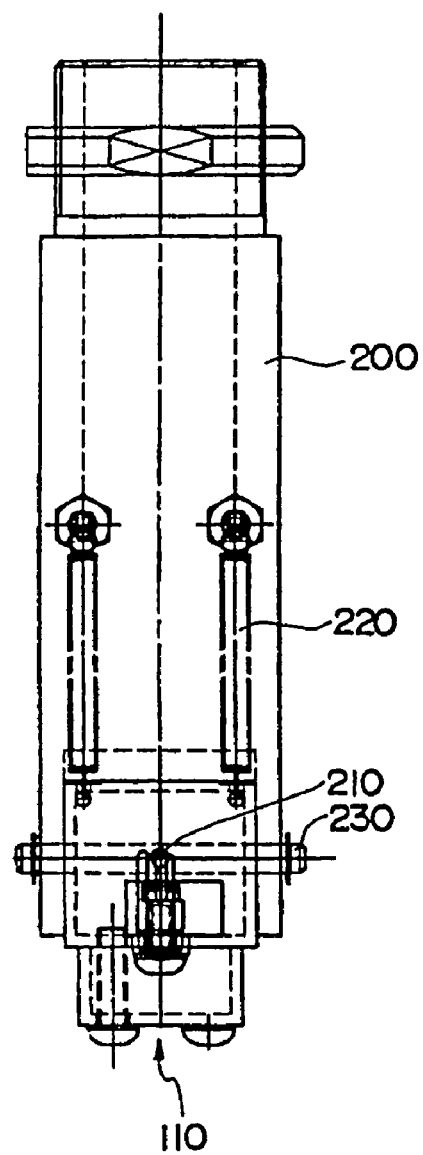
FIG. 6 is a right side view of FIG. 5.

FIG. 5 is a front view of the sensor head 110, and FIG. 6 is a right side view of FIG. 5.

The master lever 120 and the like are supported in a cantilever via a pin 230 on the housing 200, and suspended via a spring 220 on the housing 200.

The sensor lever 140 is disposed on the inner side of the master lever 120, and the movement thereof is detected via the micro switch 150.

An air nozzle 210 is formed to have an opening disposed toward the leading end of the sensor lever 140, which provides an air blow $A_1$ to the inner side of the work to clean the same.

Figure 7:
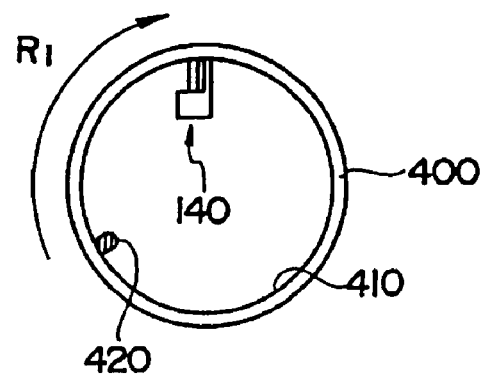
FIG. 7 is an explanatory view illustrating the process for detecting a seam existing on an inner wall surface of a cylindrical pipe.

FIG. 7 shows the process for detecting a seam 420 existing in the inner wall surface 410 of the cylindrical pipe 400.

In the case of the cylindrical pipe 400, the sensor lever 140 is stopped at the orient position of the chuck while the cylindrical pipe 400 is rotated in the direction of arrow $R_1$ via the chuck, so as to recognize the angular position of the chuck when the sensor lever 140 contacts the seam 420.

Figures 8A, 8B:
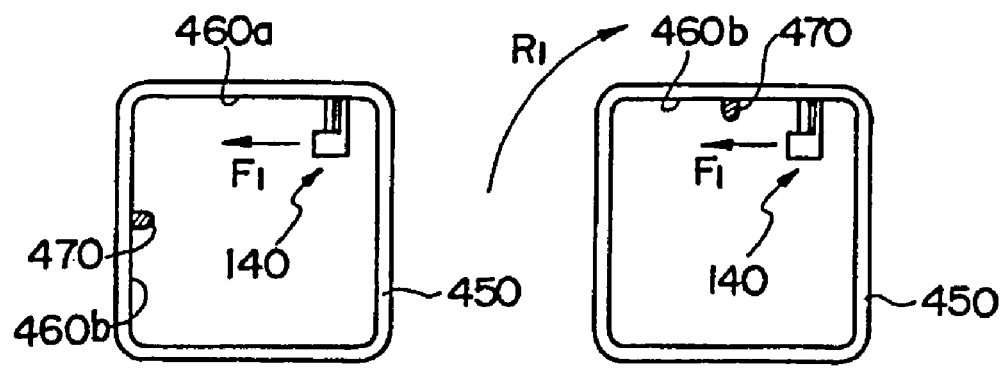
FIGS. 8A and 8B are explanatory views illustrating the process for detecting a seam existing on an inner wall surface of a square pipe.
Figure 9A:
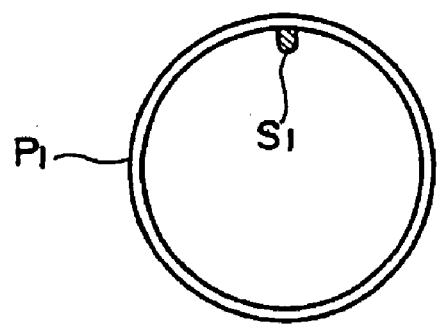
FIGS. 9A and 9B are explanatory views illustrating the existence of a seam on a welded pipe.
Figure 9B:
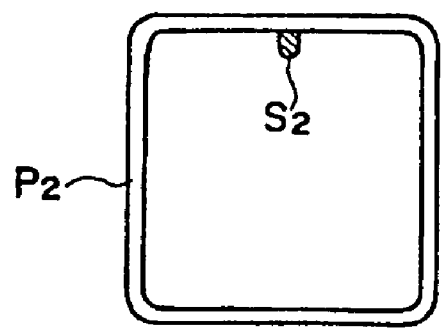

FIGS. 8A and 8B show the process for detecting a seam 470 existing in the inner wall surface of a square pipe 450.

In the case of a square pipe 450, a seam 470 exists at the center portion of one of the four inner wall surfaces.

Therefore, in the state shown in FIG. 8A, the sensor lever 140 is moved in the direction of arrow $F_1$ together with the sensor head. When no seam is detected on the inner wall surface 460a, the sensor lever 140 is moved out of the way, and the square pipe 450 is rotated for 90 degrees in the direction of arrow $R_1$ and stopped.

In this state, the sensor lever 140 is moved in the direction of arrow $F_1$ to detect the existence of the seam 470. The NC device recognizes that the seam 470 exists on the inner wall surface 460b of the square pipe 450.

According to the present invention, the three-dimensional laser beam machine is capable of automatically detecting the seam position on the welded pipe, so as to enable the welded pipe to be subjected to three-dimensional laser processing while recognizing the seam position on the pipe.

What is claimed is:

1. A pipe seam detection device of a three-dimensional laser beam machine comprising:
    a chuck for holding, rotating and axially moving a pipe;
    a laser head for subjecting the pipe to three-dimensional laser processing; and
    a sensor head coming into contact with a seam on an inner wall surface of the pipe to detect the position of the seam on the welded pipe,
    wherein the sensor head comprises a sensor lever for coming into contact with the seam and a limit switch for detecting the movement of the sensor lever imparted thereon when coming into contact with the seam.

2. The pipe seam detection device of a three-dimensional laser beam machine according to claim 1, wherein
    the pipe seam detection device further comprises a means for moving the sensor head up and down.

3. The pipe seam detection device of a three-dimensional laser beam machine according to claim 1, wherein the sensor head comprises an air nozzle for providing air blow to the portion to be detected.

4. The pipe seam detection device of a three-dimensional laser beam machine according to claim 1, wherein the sensor head further comprises a master lever that moves along the inner wall surface of the pipe in contact therewith.

5. The pipe seam detection device of a three-dimensional laser beam machine according to claim 4, wherein
    the sensor lever is pivotally attached to the master lever that moves along the inner wall surface of the pipe;
    the sensor lever pivots relative to the master lever when the sensor lever contacts the seam; and
    the limit switch detects the pivoting of the sensor lever.

6. The pipe seam detection device of a three-dimensional laser beam machine according to claim 1, wherein the sensor lever pivots when the sensor lever contacts the seam.

* * * * *